US009926498B2

(12) United States Patent
Dierickx

(10) Patent No.: US 9,926,498 B2
(45) Date of Patent: Mar. 27, 2018

(54) PROCESS FOR REMOVING OXYGENATES FROM HYDROCARBON STREAMS

(71) Applicant: Fluor Technologies Corporation, Sugar Land, TX (US)

(72) Inventor: Jan Dierickx, Heemstede (NL)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 15/164,576

(22) Filed: May 25, 2016

(65) Prior Publication Data

US 2017/0342333 A1 Nov. 30, 2017

(51) Int. Cl.
| C07C 7/148 | (2006.01) |
| C07C 7/163 | (2006.01) |
| C10G 55/06 | (2006.01) |
| C10G 29/04 | (2006.01) |

(52) U.S. Cl.
CPC ............. *C10G 55/06* (2013.01); *C10G 29/04* (2013.01); *C10G 2300/202* (2013.01)

(58) Field of Classification Search
CPC ................................ C07C 7/148; C07C 7/163
USPC ................................. 585/811, 809; 208/213
See application file for complete search history.

(56) References Cited

U.S. PATENT DOCUMENTS

| 8,309,776 B2 | 11/2012 | van Egmond et al. |
| 8,722,954 B2 | 5/2014 | Thoret Bauchet |
| 2003/0094399 A1 | 5/2003 | Podrebarac |
| 2009/0036727 A1* | 2/2009 | Kurukchi ........... B01D 53/1406 585/854 |
| 2011/0144397 A1 | 6/2011 | van Egmond et al. |
| 2016/0060190 A1 | 3/2016 | Trucko et al. |

OTHER PUBLICATIONS

International Application No. PCT/US2016/034393, International Search Report, dated Jan. 17, 2017, 3 pages.
International Application No. PCT/US2016/034393, Written Opinion of the International Searching Authority, dated Jan. 17, 2017, 6 pages.

* cited by examiner

*Primary Examiner* — Thuan D Dang
(74) *Attorney, Agent, or Firm* — Conley Rose, P.C.

(57) ABSTRACT

A method of removing oxygenates from a hydrocarbon stream comprises passing a hydrocarbon stream to a caustic tower having a plurality of loops, contacting the hydrocarbon stream with a sulfided catalyst between a first loop of the plurality of loops and a second loop of the plurality of loops to produce a reaction product, passing the reaction product to the second loop, removing at least a portion of the hydrogen sulfide in the second loop of the caustic tower to produce a product stream, and separating the product stream into a plurality of hydrocarbon streams in a separation zone located downstream of the caustic tower. The hydrocarbon stream comprises hydrocarbons, oxygen containing components, and sulfur containing compounds. At least a portion of the sulfur compounds react in the presence of the sulfided catalyst to produce hydrogen sulfide in the reaction product.

14 Claims, 1 Drawing Sheet

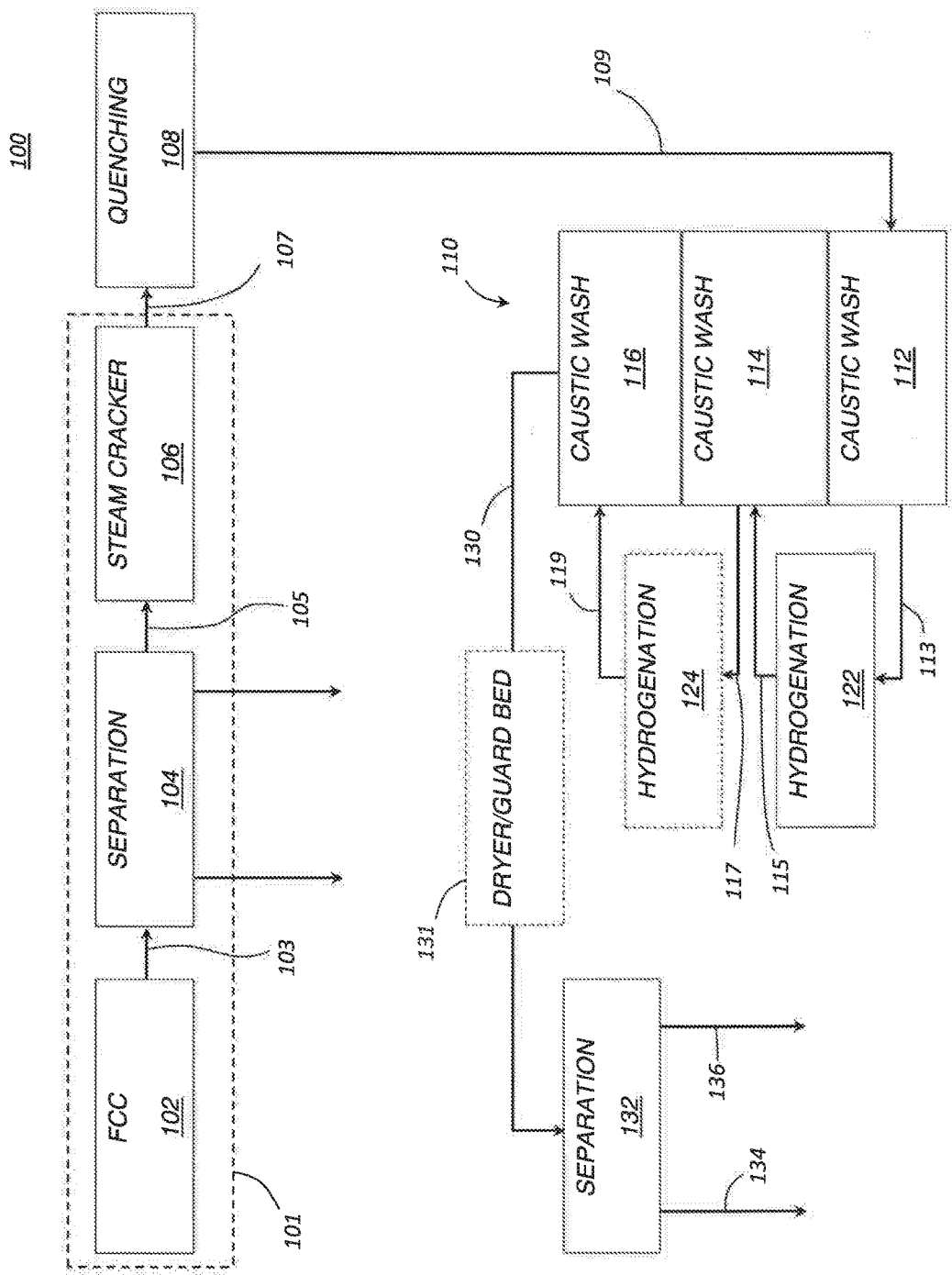

PROCESS FOR REMOVING OXYGENATES FROM HYDROCARBON STREAMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Crude oil and other hydrocarbons (e.g., various gas streams, coal, lignite, coke, biomass, etc.) can be converted into a variety of products using various processes. Initially, the valuable components can be separated and purified from a hydrocarbon stream, and the remaining components (e.g., heavy crude fractions) can be processed using various reactions to convert less valuable components into more valuable components. Cracking is an example of one process used to convert heavy hydrocarbons into lighter hydrocarbons, or upgrade lighter components into more valuable compounds. For example, olefins can be produced from hydrocarbon feedstocks by catalytic and/or steam cracking processes. These cracking processes can upgrade various reactants and produce light olefins such as ethylene and propylene from various feedstocks. Oxygen and oxygenates can be present in the various cracking processes through an introduction in the feed stream, through the process (e.g., through the oxidation of the coke on the catalyst in a Fluid Catalytic Cracker (FCC), steam introduction in steam cracking, etc.), or the like. The resulting oxygen and oxygenates may be removed along with other contaminates using various downstream processes to produce any number of saleable product streams.

SUMMARY

In an embodiment, a method of removing oxygenates from a hydrocarbon stream comprises passing a hydrocarbon stream to a caustic tower having a plurality of loops, contacting the hydrocarbon stream with a sulfided catalyst between a first loop of the plurality of loops and a second loop of the plurality of loops to produce a reaction product, passing the reaction product to the second loop, removing at least a portion of the hydrogen sulfide in the second loop of the caustic tower to produce a product stream, and separating the product stream into a plurality of hydrocarbon streams in a separation zone located downstream of the caustic tower. The hydrocarbon stream comprises hydrocarbons, oxygen containing components, and sulfur containing compounds. At least a portion of the sulfur compounds react in the presence of the sulfided catalyst to produce hydrogen sulfide in the reaction product.

In an embodiment, a system for removing oxygenates from a hydrocarbon stream comprises a caustic wash unit comprising a plurality of caustic wash loops, and a hydrogenation reactor configured to receive a first gaseous stream from a first caustic wash loop of the plurality of caustic wash loops and pass a second gaseous stream from the hydrogenation reactor to a second caustic wash loop of the plurality of caustic wash loops. The hydrogenation reactor comprises a sulfided catalyst.

In an embodiment, a method of removing oxygenates from a hydrocarbon stream comprises passing a hydrocarbon stream having one or more hydrocarbons, one or more oxygen containing components, and one or more acid gas components to a first loop of a caustic tower, removing a portion of the one or more acid gas components in the first loop of the caustic tower to produce a first product stream, passing the first product stream from the first loop of the caustic tower to a hydrogenation unit, contacting the first product stream with a sulfided catalyst in the hydrogenation unit to produce a second product stream, passing the second product stream to a second loop of the caustic tower, and removing at least a portion of the hydrogen sulfide in the second loop of the caustic tower to produce a third product stream. At least a portion of the one or more sulfur containing compounds reacts in the presence of the sulfided catalyst to produce hydrogen sulfide in the reaction product.

These and other features will be more clearly understood from the following detailed description taken in conjunction with the accompanying drawings and claims.

BRIEF DESCRIPTION OF THE DRAWING

For a more complete understanding of the present disclosure, reference is now made to the following brief description, taken in connection with the accompanying drawings and detailed description, wherein like reference numerals represent like parts.

FIG. 1 illustrates a schematic flow diagram of a process for removing oxygen containing compounds according to an embodiment.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly,"

"typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein is a system and methods for removing oxygenates from a hydrocarbon stream, such as a stream from a cracking process, which integrates a hydrogenation unit with an acid removal unit. The hydrogenation unit can use sulfided catalysts to handle streams with sulfur and other acid gases. The hydrogenation unit can be integrated between two loops of an acid removal unit such as a caustic wash tower. The integration of the hydrogenation process with the caustic wash tower may reduce the need for upstream wet-treatment processes such as a water wash, an amine unit, additional caustic washes, and the like, and in some embodiments, the process does not have a water wash step immediately prior to the caustic wash tower or hydrogenation unit. The integrated process may be useful for treating the effluent of a steam cracking unit.

Olefin containing streams can be produced from various petroleum feedstocks at high temperature by steam-cracking, fluid catalytic cracking, deep catalytic cracking processes, or the like. Olefin containing streams can also be produced from oxygenates, such as alcohols, or combustion gases such as syngas. Synthesis gas can be produced using a combustion reaction of natural gas, such as methane, and an oxygen source to produce hydrogen, carbon monoxide, and/or carbon dioxide. Syngas production processes are well known and include conventional steam reforming, autothermal reforming or a combination thereof.

In fluid catalytic cracker (FCC) processes, a preheated hydrocarbon feedstock of a high boiling point range can be brought into contact with a hot cracking catalyst in a catalytic cracking reactor, usually a riser. The feed is cracked into lower boiling products, such as dry gas, liquefied petroleum gas, gasoline, and various oil fractions. Furthermore, coke and non-volatile products deposit on the catalyst resulting in a spent catalyst. The reactor exits into a separator wherein the spent catalyst is separated from the reaction products. The spent catalyst can then be stripped with steam to remove the non-volatile hydrocarbon products from the catalyst. The stripped catalyst can be sent to a regenerator in which coke and remaining hydrocarbon materials are combusted in the presence of oxygen and the resulting heat of combustion can be used to heat the catalyst to a temperature required for the cracking reactions. The hot, regenerated catalyst can be returned to the reactor for further cracking reactions. The resulting products can then be separated into a plurality of product streams using various separation trains. Some of the products can be further subjected to various processes and/or steps to further convert the products into upgraded product streams.

Within these various processes, byproducts such as alkynes (e.g., acetylene, methyl acetylene, etc.), diolefins, hydrogen, paraffins, and oxygen containing compounds such as carbon monoxide, oxygen, nitric oxide, ethers, esters, acids, carbonyls, and the like can also be produced. When combined with diolefins, the oxygen containing compounds can form various compounds that can foul various separators, and in some instances, form explosive gums that can lead to safety issues with operation of a facility. The composition and amount of these compounds depends on the type of the conversion treatment, and these can be removed prior to introducing the product streams to various downstream treatments to avoid poisoning various catalysts (e.g., hydrogenation catalysts, polymerization catalysts, etc.).

In some embodiments, the product streams can comprise one or more acid gases or components such as sulfur compounds (e.g., hydrogen sulfide, sulfur oxides, thiols, etc.), carbon dioxide, nitric oxides, and the like. When sulfur is present, the sulfur can poison noble metal based hydrogenation catalysts such as platinum, palladium, or other Group VIII metals. Rather than using these types of catalysts, various sulfided catalysts that can tolerate the presence of sulfur within certain concentration ranges can be used to hydrogenate the oxygenates and other byproduct compounds. The use of a hydrogenation process with a product stream comprises sulfur compounds and/or oxygenates can result in the generation of acid gas components such as carbon dioxide and hydrogen sulfide, which can be removed in an acid gas removal process. One such process includes a caustic wash cycle.

As disclosed herein, a sulfided catalyst can be used to hydrogenate and remove various byproducts including oxygen containing compounds in a product stream from one or more cracking process. In general, the product stream can comprise a dry gas stream having heavier condensable components removed. The hydrogenation process using the sulfided catalyst can be integrated between two loops of a caustic wash process. The placement of the hydrogenation process between the caustic wash loops may allow an upstream water wash to be removed or eliminated from the process. This process configuration may also reduce the need for guard beds to remove various components such as arsine, phosphine, mercury, carbonyl sulfide, water, carbon dioxide, nitrogen oxides, and sulfur compounds that can be associated with a hydrogenation process using a Group VIII metal. Even if these processes and guard beds are present, their size can be reduced based on the process comprising the hydrogenation process using the sulfided catalyst located between the caustic wash loops.

FIG. 1 schematically illustrates a process flow diagram of a system 100 for removing oxygen containing compounds from a product stream. As shown in FIG. 1, a hydrocarbon processing unit 101 may initially generate a product stream containing various hydrocarbons such as methane, ethane, olefins (e.g., ethylene, propylene, etc.), and one or more byproducts or contaminants such as oxygen containing compounds and sulfur or sulfur compounds.

The hydrocarbon processing unit 101 can comprise any of the reforming or cracking processes described herein including FCC, steam cracking, deep catalytic cracking processes, or the like. Additional processes capable of producing a product stream comprising acid gas components and/or sulfur can form a part of the hydrocarbon processing unit 101. Other processing units such as synthesis gas units, a methanol-to-olefin reactor, or the like can be present and produce a product stream that can be hydrogenated in the process described herein.

In some embodiments, the hydrocarbon processing unit 101 can comprise an FCC unit 102 producing a first product stream in line 103. The FCC product stream can comprise a number of components that can be further upgraded in a stream cracking unit 106. While the entire FCC product stream can be sent to the steam cracking unit 106, some embodiments may first separate the FCC product stream in line 103 into a variety of streams. The FCC product stream may be separated in a separation unit 104 into a dry gas stream and at least one other product stream such as a fuel oil stream, a naphtha stream, and/or other product streams.

For example, the FCC product stream can be compressed and cooled to condense and separate one or more fractions from the FCC product stream. The dry gas stream generally comprises the non-condensable components of the FCC product stream such as hydrogen, methane, ethane, propane, and various contaminants such as oxygen containing compounds (e.g., carbon monoxide, carbon dioxide, etc.) and sulfur or sulfur compounds (e.g., hydrogen sulfide, sulfur oxides, thiols, etc.). While two separate product lines in addition to line 105 are shown leaving the separation unit 104 in FIG. 1, any number of product streams can be separated and produced from the separation unit 104.

The dry gas stream can pass through line 105 to the steam cracking unit 106. Within the steam cracking unit 106, the dry gas can be combined with high temperature, high pressure steam to cause a conversion of a portion of the methane, ethane, and any propane into ethylene and propylene along with various oxygenated compounds and other acid gases. Oxygen can be introduced through the use of steam to generate additional oxygen containing compounds in the steam cracking unit 106. Since only the dry gas may be passed to the steam cracking unit 106, the acid gas components may not be removed from the dry gas prior to the dry gas passing to the steam cracking unit 106 for processing.

In some embodiments, the hydrocarbon processing unit 101 can comprise any number of FCC, steam cracking, or other processing units, and the units can be arranged in series or parallel. For example, the FCC product stream can be combined with a steam cracking unit product stream prior to passing to the downstream processing units.

The resulting product stream in line 107 can comprise the products from the hydrocarbon processing unit 101. In some embodiments, an optional quenching unit 108 may be used to cool the product stream to a desired temperature and/or remove any solids (e.g., FCC catalyst fines, etc.) or entrained liquids prior to passing the product stream to the acid gas removal unit 110. While a quenching unit 108 is shown in FIG. 1, any suitable unit or process for cooling the process stream such as a heat exchanger or the like can be used to reduce the temperature of the product stream in line 109 to a desired temperature.

The hydrocarbon product stream in line 109 can have an acid gas concentration and/or sulfur concentration that could poison a group VIII metal hydrogenation catalyst. In an embodiment, the hydrocarbon product stream can have a sulfur content of between about 1 ppm to about 1,000 ppm by weight, between about 5 ppm and about 250 ppm by weight. In some embodiments, the hydrocarbon product stream in line 109 can have a sulfur content greater than about 50 ppm, greater than about 60 ppm, greater than about 70 ppm, or greater than about 80 ppm, each by weight.

The acid gas removal unit 110 can comprise any suitable unit for removing at least a portion of the acid gases present in the product stream from the hydrocarbon processing unit 101. The acid gas removal unit 110 can serve to remove acid gases such as carbon dioxide and hydrogen sulfide. Solid or liquid acid gas treatment systems can be used in this acid gas removal unit 110. In these types of units, the acid gas can be removed from the product stream by contacting the product stream with an acid gas absorbent or adsorbent. Examples of such absorbents or adsorbents include amines, potassium carbonate, caustic, alumina, molecular sieves and membranes, particularly membranes formed of polysulfone, polyimide, polyamide, glassy polymer and cellulose acetate. Caustic compounds suitable for use in the acid gas removal unit can include alkaline compounds, which are effective in removing acid gas from a hydrocarbon containing product stream such as various hydroxides (e.g., sodium hydroxide, potassium hydroxide, etc.). When a caustic solution is used as described herein, the caustic solution can have a concentration from about 1% to about 30% by weight, or from about 2% to about 20% by weight.

In an embodiment, the acid gas removal unit 110 can comprise a caustic wash tower having a plurality of wash loops. In an embodiment, the caustic wash tower can comprise a packed column, although a plate absorption column may also be used. The absorbent liquid (the alkaline solution) can be evenly distributed across the top of the column using a distributor plate, spray nozzles, or the like. At the bottom of the absorption column is a gas inlet where product stream containing the oxygen containing compounds and acid gases can enter the absorption column. The vapor components can move up the column countercurrent to the liquid absorbent moving down the column in a countercurrent absorption process. The packing or plates in the column provides a surface for contact between the vapor and liquid components within the column. In a countercurrent absorption column, the concentration of soluble gasses in both the liquid and vapor phases is greatest at the bottom of the column, and lowest at the top of the column. The outlet for the liquid is at or near the bottom of the absorption column, typically below the gas inlet. The outlet for the gas phase lean in the acid gasses most soluble in the liquid absorbent is at the top of the absorption column, typically above the liquid inlet. The caustic wash tower can operate at any pressure, and may generally operate at a pressure slightly below the pressure of the olefin-containing hydrocarbon stream. The temperature within the caustic wash tower is selected so that the alkaline solution remains in the liquid state.

In an embodiment, the acid gas removal process can comprise a plurality of loops 112, 114, 116. The concentration of the caustic solution within each loop can vary in order to effect the removal of the acid gas components. The loops can represent individual caustic wash towers arranged in series, or a series of caustic wash zones within one or more caustic wash towers using, for example, collection trays, side draws, pump arounds, caustic makeup stream, and the like at various locations within the column. As schematically shown in FIG. 1, three caustic wash loops 112, 114, 116 can be present, with the hydrocarbon product stream in line 109 passing through each of the caustic wash loops 112, 114, 116 in series. While three caustic wash loops 112, 114, 116 are shown, only two caustic wash loops or more than three caustic wash loops may be present.

When three caustic wash loops are present, the concentration of the caustic solution used in each caustic wash loop 112, 114, 116 can generally increase from the first caustic wash loop 112 to the second caustic wash loop 114, and further increase from the second caustic wash loop 114 to the third caustic wash loop 116. For example, the caustic solution in the first caustic wash loop 112 can have a caustic concentration between about 0.5% and about 10% by weight, or between about 1% to about 3% by weight. The caustic solution in the second caustic wash loop 114 can have a caustic concentration between about 5% and about 15% by weight, or between about 8% and about 12% by weight. The caustic solution in the third caustic wash loop 116 can have a caustic concentration between about 15% and about 25% by weight, or between about 18% and about 22% by weight.

As shown in FIG. 1, a hydrogenation process can be carried out in a hydrogenation unit 122 between two of the caustic wash loops 112, 114 of a multi-loop caustic wash unit. When the hydrogenation reactor is between the first caustic wash loop 112 and the second caustic wash loop 114, the hydrocarbon product stream in line 109 can pass through the first caustic wash loop 112 before passing through line 113 to the hydrogenation unit 122. The products from the hydrogenation unit 122 can then pass through line 115 to the second caustic wash loop 114. In some embodiments, the gaseous stream from the second caustic wash loop 114 can then pass to the third caustic wash loop 116 before passing out of the acid gas removal unit 110 through line 130.

In some embodiments, the hydrogenation unit can be located between the second and third caustic wash loops. In this embodiment, the hydrocarbon product stream in line 109 can pass through the first caustic wash loop 112 before passing to the second caustic wash loop 114. The gaseous products from the second caustic wash loop 114 can then pass through line 117 to the hydrogenation unit 124. The products from the hydrogenation unit 124 can then pass through line 119 to the third caustic wash loop 116. The gaseous stream from the third caustic wash loop 116 can then pass out of the acid gas removal unit 110 through line 130. In general, the hydrogenation unit will only be present in one location between two of the caustic wash loops. In some embodiments, multiple hydrogenation units can be present, such that, for example, both hydrogenation unit 122 and hydrogenation unit 124 are present in the system 100.

The hydrogenation unit 122 can hydrogenate various components including alkynes, oxygen containing compounds, and sulfur containing compounds to allow the components to be converted to more easily removable compounds such as carbon dioxide, hydrogen sulfide, and the like. These compounds can be hydrogenated over a sulfided catalyst such as a sulfided copper or sulfided nickel catalyst. In an embodiment, the catalyst can comprise a sulfided nickel catalyst. Other sulfided catalysts could also be used such as sulfides of zinc, copper, gallium, cadmium, chromium, molybdenum, tungsten, cobalt, nickel, ruthenium, iron, and any mixtures thereof. The catalyst can be suitably formed and/or supported on various supports including, for example, the silica or alumina, with or without a promoter metal is well known in the art. In order to effect the hydrogenation, the hydrocarbon product stream can contain or be mixed with an excess of hydrogen or hydrogen rich gas over the hydrogenation catalyst under suitable hydrogenation conditions.

The hydrogenation unit 122 can tolerate sulfur in the process stream, but the level of sulfur may need to be controlled. In an embodiment, the hydrogenation can be carried out with the sulfur level in the stream in line 113 reduced to less than about 80 ppm, less than about 70 ppm, less than about 60 ppm, or less than about 50 ppm by weight. The concentration and conditions in the first caustic wash loop 112 can be configured to reduce the sulfur content in the hydrocarbon product stream in line 109 to a level suitable for hydrogenating the stream in the hydrogenation unit 122. For example, any acid gas components such as hydrogen sulfide in the hydrocarbon product stream in line 109 can be at least partially removed in the first caustic wash loop 112 to reduce the total sulfur concentration to below an operating threshold for the sulfided catalyst. The resulting acid gas components from the hydrogenation unit 122 can then be removed in the downstream caustic wash loops in the acid gas removal unit 110.

The hydrogenation unit 122 and/or the hydrogenation unit 124 can remove at least about 80%, at least about 90%, at least about 95%, at least about 97%, at least about 98%, or at least about 99% of the oxygen containing compounds and sulfur/sulfur compounds from the hydrocarbon stream entering the hydrogenation unit. The downstream caustic wash loops can then effectively remove at least about 80%, at least about 90%, at least about 95%, at least about 97%, or at least about 98% of the acid gas components produced in the hydrogenation unit 122 and/or the hydrogenation unit 124. The resulting hydrocarbon stream in line 130 may then have a reduced level of byproducts, oxygen containing compounds, and sulfur as compared to the hydrocarbon product stream in line 109. Further, the integration of the hydrogenation unit 122 and/or hydrogenation unit 124 with the caustic wash system may reduce the number of wet scrubbing processes required upstream and/or downstream of the integrated hydrogenation unit/caustic wash unit when compared to other processes in which the hydrogenation unit using a sulfided catalyst is not integrated with the acid gas removal unit 110.

Following acid gas removal unit 110, the hydrocarbon stream in line 130 can be further treated using various downstream processing units. In some embodiments, the hydrocarbon stream in line 130 may be dried using an optional water removal unit 131 including a desiccant dryer, a molsieve dryer, absorbents, or the like to provide a substantially dry stream, which may help to prevent the formation of ice or hydrates in any subsequent cryogenic distillation recovery systems.

In some embodiments, an additional hydrogenation step can be carried out downstream of the integrated acid gas removal unit 110 and hydrogenation unit 122 and/or hydrogenation unit 124, depending on the presence of various components in the hydrocarbon stream in line 130.

The dried gas can then be sent to a downstream separation unit 132 to separate the hydrocarbon stream into one or more product streams. The separation unit 132 can include any number of suitable separators or separation trains to produce a plurality of product streams (e.g., pass through outlet lines 134, 136, etc.). Typical product streams can include one or more of a light gas stream comprising hydrogen and/or methane, an ethane stream, an ethylene stream, a propylene stream, and potentially additional streams depending on the makeup of the hydrocarbon stream entering the separation unit 132.

Having described numerous devices, systems, and methods herein, various embodiments can include, but are not limited to:

In a first embodiment, a method of removing oxygenates from a hydrocarbon stream comprises passing a hydrocarbon stream to a caustic tower, wherein the hydrocarbon stream comprises one or more hydrocarbons, one or more oxygen containing components, and one or more sulfur containing compounds, and wherein the caustic tower comprises a plurality of loops, contacting the hydrocarbon stream with a sulfided catalyst between a first loop of the plurality of loops and a second loop of the plurality of loops to produce a reaction product, wherein at least a portion of the one or more sulfur containing compounds react in the presence of the sulfided catalyst to produce hydrogen sulfide in the reaction product, passing the reaction product to the second loop, removing at least a portion of the hydrogen sulfide in the second loop of the caustic tower to produce a product stream, and separating the product stream into a plurality of hydrocarbon streams in a separation zone located downstream of the caustic tower.

A second embodiment can include the method of the first embodiment, further comprising: producing the hydrocarbon stream in a cracking process, wherein the cracking process comprises at least one of a fluid catalytic cracking process, a steam cracking process, or a deep catalytic cracking process.

A third embodiment can include the method of the second embodiment, wherein producing the hydrocarbon stream comprises: producing a first product stream in a fluid catalytic cracking process; separating the first product stream to obtain a dry gas stream from the first product stream; passing the dry gas stream to a steam cracking unit; and cracking the dry gas stream in the steam cracking unit to produce the hydrocarbon stream.

A fourth embodiment can include the method of any of the first to third embodiments, wherein the hydrocarbon stream comprises a sulfur concentration of greater than about 80 ppm by weight.

A fifth embodiment can include the method of the fourth embodiment, further comprising: reducing the sulfur concentration of the hydrocarbon stream to less than about 80 ppm by weight in the first loop of the caustic tower prior to contacting the hydrocarbon stream with the sulfided catalyst.

A sixth embodiment can include the method of any of the first to fifth embodiments, wherein the sulfided catalyst comprises nickel sulfide.

A seventh embodiment can include the method of any of the first to sixth embodiments, wherein the first loop uses a caustic solution having a caustic concentration of between about 0.5% and about 10%.

An eighth embodiment can include the method of any of the first to seventh embodiments, wherein at least a portion of the one or more oxygen containing components react in the presence of the sulfided catalyst to produce carbon dioxide in the reaction product, and wherein the method further comprises removing at least a portion of the carbon dioxide in the second loop of the caustic tower.

A ninth embodiment can include the method of any of the first to eighth embodiments, wherein the hydrocarbon stream comprises an olefin.

A tenth embodiment can include the method of any of the first to ninth embodiments, wherein the product stream comprises hydrogen, methane, ethane, propane, butane, ethylene, propylene, butene, or any combination thereof.

In an eleventh embodiment, a system for removing oxygenates from a hydrocarbon stream comprises a caustic wash unit comprising a plurality of caustic wash loops; and a hydrogenation reactor configured to receive a first gaseous stream from a first caustic wash loop of the plurality of caustic wash loops and pass a second gaseous stream from the hydrogenation reactor to a second caustic wash loop of the plurality of caustic wash loops, wherein the hydrogenation reactor comprises a sulfided catalyst.

A twelfth embodiment can include the system of the eleventh embodiment, further comprising: a cracking unit configured to convert one or more hydrocarbons to lighter products, wherein the cracking unit is fluidly coupled to the caustic wash unit and is arranged upstream of the caustic wash unit.

A thirteenth embodiment can include the system of the twelfth embodiment, wherein the cracking unit comprises a fluid catalytic cracking unit, a steam cracking unit, or any combination thereof.

A fourteenth embodiment can include the system of the twelfth or thirteenth embodiment, wherein the cracking unit comprises: a fluid catalytic cracking unit; a separation unit fluidly coupled to the fluid catalytic cracking unit and configured to receive a first product stream from the fluid catalytic cracking unit and separate a dry gas stream from the first product stream; and a steam cracking unit fluidly coupled to the separation unit and configured to receive the dry gas stream from the separation unit.

A fifteenth embodiment can include the system of any of the eleventh to fourteenth embodiments, wherein the sulfided catalysts comprise a sulfide of nickel, zinc, copper, gallium, cadmium, chromium, molybdenum, tungsten, cobalt, ruthenium, iron, or any mixtures thereof.

A sixteenth embodiment can include the system of any of the eleventh to fifteenth embodiments, further comprising: a dryer fluidly coupled to the caustic wash unit, wherein the dryer is configured to receive a gaseous product stream from the caustic wash unit and remove at least a portion of the water in the gaseous product stream.

A seventeenth embodiment can include the system of any of the eleventh to sixteenth embodiments, further comprising: a separation unit fluidly coupled to the caustic wash unit, wherein the separation unit is disposed downstream of the caustic wash unit, and wherein the separation unit is configured to receive a gaseous product stream from the caustic wash unit and separate the gaseous product stream into a plurality of product streams.

In an eighteenth embodiment, a method of removing oxygenates from a hydrocarbon stream comprises passing a hydrocarbon stream to a first loop of a caustic tower, wherein the hydrocarbon stream comprises one or more hydrocarbons, one or more oxygen containing components, and one or more acid gas components; removing a portion of the one or more acid gas components in the first loop of the caustic tower to produce a first product stream; passing the first product stream from the first loop of the caustic tower to a hydrogenation unit; contacting the first product stream with a sulfided catalyst in the hydrogenation unit to produce a second product stream, wherein at least a portion of the one or more sulfur containing compounds react in the presence of the sulfided catalyst to produce hydrogen sulfide in the reaction product; passing the second product stream to a second loop of the caustic tower, and removing at least a portion of the hydrogen sulfide in the second loop of the caustic tower to produce a third product stream.

A nineteenth embodiment can include the method of the eighteenth embodiment, further comprising: contacting a hydrocarbon feed stream with a catalyst in a fluid catalytic cracking unit; generating a product stream comprising olefins in the fluid catalytic cracking unit; separating the product stream to produce a dry gas stream, wherein the dry gas stream comprises at least a portion of the olefins; passing the dry gas stream to a steam cracking unit; generating the hydrocarbon stream in the steam cracking unit; and passing the hydrocarbon stream to the caustic tower.

A twentieth embodiment can include the method of the nineteenth embodiment, further comprising: separating the third product stream into a plurality of hydrocarbon streams in a separation system located downstream of the caustic tower.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
   passing a hydrocarbon stream to a caustic tower, wherein the hydrocarbon stream comprises one or more hydrocarbons, one or more oxygen containing components, and one or more sulfur containing compounds, and wherein the caustic tower comprises a plurality of loops;
   contacting the hydrocarbon stream with a sulfided catalyst between a first loop of the plurality of loops and a second loop of the plurality of loops to produce a reaction product, wherein at least a portion of the one or more sulfur containing compounds reacts in the presence of the sulfided catalyst to produce hydrogen sulfide in the reaction product;
   passing the reaction product to the second loop; and
   removing at least a portion of the hydrogen sulfide in the second loop of the caustic tower to produce a product stream.

2. The method of claim 1, further comprising:
   producing the hydrocarbon stream in a cracking process, wherein the cracking process comprises at least one of a fluid catalytic cracking process, a steam cracking process, and a deep catalytic cracking process.

3. The method of claim 2, wherein producing the hydrocarbon stream comprises:
   producing a first product stream in a fluid catalytic cracking process;
   separating the first product stream to obtain a dry gas stream from the first product stream;
   passing the dry gas stream to a steam cracking unit; and
   cracking the dry gas stream in the steam cracking unit to produce the hydrocarbon stream.

4. The method of claim 1, wherein the hydrocarbon stream comprises a sulfur concentration of greater than about 80 ppm by weight.

5. The method of claim 4, further comprising:
   reducing the sulfur concentration of the hydrocarbon stream to less than about 80 ppm by weight in the first loop of the caustic tower prior to contacting the hydrocarbon stream with the sulfided catalyst.

6. The method of claim 1, wherein the sulfided catalyst comprises nickel sulfide.

7. The method of claim 1, wherein the first loop uses a caustic solution having a caustic concentration of between about 0.5% and about 10%.

8. The method of claim 1, wherein at least a portion of the one or more oxygen containing components reacts in the presence of the sulfided catalyst to produce carbon dioxide in the reaction product, and wherein the method further comprises removing at least a portion of the carbon dioxide in the second loop of the caustic tower.

9. The method of claim 1, wherein the hydrocarbon stream comprises an olefin.

10. The method of claim 1, wherein the product stream comprises hydrogen, methane, ethane, propane, butane, ethylene, propylene, butene, or any combination thereof.

11. The method of claim 1, further comprising:
    separating the product stream into a plurality of hydrocarbon streams in a separation zone located downstream of the caustic tower.

12. A method comprising:
    passing a hydrocarbon stream to a first loop of a caustic tower, wherein the hydrocarbon stream comprises one or more hydrocarbons, one or more oxygen containing components, and one or more acid gas components;

removing a portion of the one or more acid gas components in the first loop of the caustic tower to produce a first product stream;

passing the first product stream from the first loop of the caustic tower to a hydrogenation unit;

contacting the first product stream with a sulfided catalyst in the hydrogenation unit to produce a second product stream, wherein at least a portion of one or more sulfur containing compounds reacts in the presence of the sulfided catalyst to produce hydrogen sulfide in the second product stream;

passing the second product stream to a second loop of the caustic tower; and removing at least a portion of the hydrogen sulfide in the second product stream in the second loop of the caustic tower to produce a third product stream.

13. The method of claim 12, further comprising:

contacting a hydrocarbon feed stream with a cracking catalyst in a fluid catalytic cracking unit;

generating a fourth product stream comprising olefins in the fluid catalytic cracking unit;

separating the fourth product stream to produce a dry gas stream, wherein the dry gas stream comprises at least a portion of the olefins;

passing the dry gas stream to a steam cracking unit;

generating the hydrocarbon stream in the steam cracking unit; and passing the hydrocarbon stream to the caustic tower.

14. The method of claim 13, further comprising:

separating the third product stream into a plurality of hydrocarbon streams in a separation system located downstream of the caustic tower.

\* \* \* \* \*